(12) United States Patent
Lahmann

(10) Patent No.: US 12,129,027 B1
(45) Date of Patent: Oct. 29, 2024

(54) SYSTEM, METHOD AND APPARATUS FOR PROVIDING ELECTROMAGNETIC VARIABLE EXCITER SYSTEM FOR INSPECTION OF FERROUS MATERIAL

(71) Applicant: VALMONT INDUSTRIES, INC., Omaha, NE (US)

(72) Inventor: Jacob Lahmann, Omaha, NE (US)

(73) Assignee: VALMONT INDUSTRIES, INC.

( * ) Notice: Subject to any disclaimer, the term of this patent is extended or adjusted under 35 U.S.C. 154(b) by 419 days.

(21) Appl. No.: 17/708,464

(22) Filed: Mar. 30, 2022

Related U.S. Application Data

(60) Provisional application No. 63/169,476, filed on Apr. 1, 2021.

(51) Int. Cl.

| | |
|---|---|
| *B64C 39/00* | (2023.01) |
| *B64C 39/02* | (2023.01) |
| *H01Q 1/32* | (2006.01) |
| *H04B 1/3827* | (2015.01) |
| *H04B 1/40* | (2015.01) |
| *B64U 50/19* | (2023.01) |
| *B64U 101/00* | (2023.01) |

(52) U.S. Cl.
CPC ......... *B64C 39/024* (2013.01); *H01Q 1/3233* (2013.01); *H04B 1/3827* (2013.01); *H04B 1/40* (2013.01); *B64U 50/19* (2023.01); *B64U 2101/00* (2023.01)

(58) Field of Classification Search
CPC .. B64C 39/024; B64U 50/19; B64U 2101/00; H01Q 1/3233; H04B 1/3827; H04B 1/40
See application file for complete search history.

(56) References Cited

U.S. PATENT DOCUMENTS

| | | | |
|---|---|---|---|
| 2017/0073085 A1* | 3/2017 | Tremblay | ................ B64F 1/362 |
| 2019/0086920 A1* | 3/2019 | Miller | .................. G02B 27/644 |
| 2020/0174478 A1 | 6/2020 | Abdellatif et al. | |
| 2021/0356255 A1* | 11/2021 | Sweers | ................ G01B 11/303 |
| 2021/0394902 A1* | 12/2021 | Troy | ..................... B64C 39/024 |
| 2022/0347855 A1* | 11/2022 | Priest | ..................... H04N 7/181 |

\* cited by examiner

*Primary Examiner* — Francis C Gray
(74) *Attorney, Agent, or Firm* — Milligan PC LLO

(57) ABSTRACT

A system and method for exciting a target area with an excitation source which is affixed or deployed via an Unmanned Aerial Vehicle (UAV). According to a preferred embodiment, the excitation source may include a heat, magnetic or light source. According to a preferred embodiment, the system of the present invention magnetically excites ferrous material by the use of an array of electromagnets. According to preferred embodiments, the present invention also includes utilizing a UAV mounted IR thermometer to record the ambient temperature of the area to be inspected. Additionally, the present invention teaches using the detected ambient temperature and type of material being inspected to determine an inspection method for the target area. According to a preferred embodiment, the target area may be excited by heat, magnetics or visually enhanced to an appropriate level based on analysis by the system.

18 Claims, 4 Drawing Sheets

SYSTEM, METHOD AND APPARATUS FOR PROVIDING ELECTROMAGNETIC VARIABLE EXCITER SYSTEM FOR INSPECTION OF FERROUS MATERIAL

RELATED APPLICATIONS

The present application claims priority to U.S. Provisional Application No. 63/169,476 filed Apr. 1, 2021.

FIELD OF THE PRESENT INVENTION

The present invention relates to an electromagnetic variable exciter system for inspection of ferrous material.

BACKGROUND OF THE INVENTION

Modern infrastructure requires significant amounts of ferrous materials being suspended at greater and greater heights. Regardless of its location or height, structures formed of ferrous materials require routine inspection. This is particularly important for pipelines, suspension poles, bridging cables and the like which are exposed to the elements and which support great amounts of weight.

Increasingly, unmanned aerial vehicles (UAVs) and the like are used to inspect structures which are suspended and difficult to reach. An example of these types of systems is shown in U.S. Publication No. 2020/0174478 to Abdullatif, which teaches the use of a UAV to inspect a ferromagnetic surface. As taught by Abdullatif, the UAV is designed to attach to the ferromagnetic surface and release one or more crawling vehicles to visually inspect and mark the surface of the inspected object.

The prior art such as Abdullatif is limited in what it can inspect and the data it can provide. What is needed is a more comprehensive system for allowing the inspection of surfaces containing ferromagnetic materials.

SUMMARY OF THE PRESENT INVENTION

The present invention overcomes the limitations of the prior art by providing a system and method for exciting a target area with an excitation source which is affixed or deployed via an Unmanned Aerial Vehicle (UAV). According to a preferred embodiment, the excitation source may include a heat, magnetic or light source. According to a preferred embodiment, the system of the present invention magnetically excites ferrous material by the use of an array of electromagnets. According to preferred embodiments, the present invention also includes utilizing a UAV mounted IR thermometer to record the ambient temperature of the area to be inspected. Additionally, the present invention teaches using the detected ambient temperature and type of material being inspected to determine an inspection method for the target area. According to a preferred embodiment, the target area may be excited by heat, magnetics or visually enhanced to an appropriate level based on analysis by the system.

According to preferred embodiments, the present invention teaches using the detected ambient temperature and type of material being inspected to determine an inspection method for the target area. According to preferred embodiments, the present invention teaches the use of an IR thermal camera to photograph the area of interest using an appropriate color palette based upon the type of material being inspected. According to a further preferred embodiment, the system of the present invention includes analyzing excited target areas to identify anomalies, weaknesses, and/or cracks.

Additionally, the present invention teaches the use of wireless control of magnetic latching and phased reversal of polarity to maintain latching should reversal be required after mounting. According to a further preferred embodiment, the present invention teaches wireless control and monitoring of magnetic field strength via either analog or digital linkage.

According to further preferred embodiments, the present invention teaches mechanical features including a tensioned-hinged array to allow for the system to better attached to ferrous surfaces.

Other goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of preferable embodiments. For each aspect of the invention, many variations are possible as suggested herein that are known to those of ordinary skill in the art. A variety of changes and modifications can be made within the scope of the invention without departing from the spirit thereof.

BRIEF DESCRIPTION OF THE DRAWINGS

Elements in the figures have not necessarily been drawn to scale in order to enhance their clarity and to improve the understanding of the various elements and embodiments of the invention. Furthermore, elements that are known to be common and well understood to those in the industry are not depicted in order to provide a clear view of the various embodiments of the invention. Thus, it should be understood that the drawings are generalized in form in the interest of clarity and conciseness.

DESCRIPTION OF THE PREFERRED EMBODIMENTS

Figure 1:
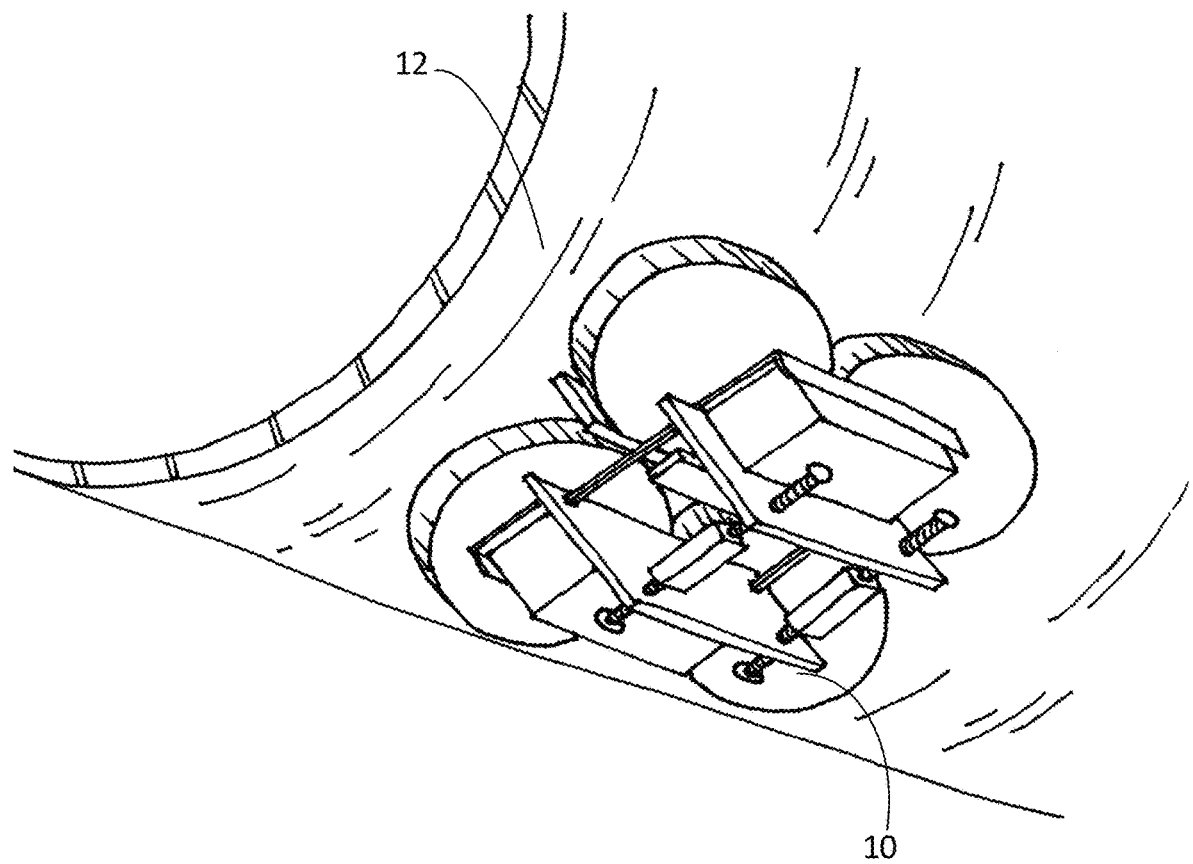
FIG. 1 is a perspective view of an exemplary embodiment of an exciter system according to a first preferred embodiment of the present invention.

For the purposes of promoting an understanding of the principles of the present invention, reference will now be made to the embodiments illustrated in the drawings and specific language will be used to describe the same. It will nevertheless be understood that no limitation of the scope of the present invention is hereby intended and such alterations and further modifications in the illustrated devices are contemplated as would normally occur to one skilled in the art. The descriptions, embodiments and figures used are not to be taken as limiting the scope of the claims.

Where the specification describes advantages of an embodiment or limitations of other prior art, the applicant does not intend to disclaim or disavow any potential embodiments covered by the appended claims unless the applicant specifically states that it is "hereby disclaiming or disavowing" potential claim scope. Moreover, the terms "embodiments of the invention", "embodiments" or "invention" do not require that all embodiments of the invention include the discussed feature, advantage, or mode of operation, nor that it does not incorporate aspects of the prior art which are sub-optimal or disadvantageous.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Additionally, any examples or illustrations given herein are not to be regarded in any way as restrictions on, limits to, or express definitions of, any term or terms with which they are utilized. Instead, these examples or illustrations are to be regarded as illustrative only.

As used herein, the singular forms "a", "an" and "the" are intended to include the plural forms as well, unless the context clearly indicates otherwise. Additionally, the word "may" is used in a permissive sense (i.e., meaning "having the potential to"), rather than the mandatory sense (i.e. meaning "must"). Further, it should also be understood that throughout this disclosure, unless logically required to be otherwise, where a process or method is shown or described, the steps of the method may be performed in any order (i.e., repetitively, iteratively or simultaneously) and selected steps may be omitted. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many of the embodiments described herein are described in terms of sequences of actions to be performed by, for example, elements of a controller. It should be recognized by those skilled in the art that the various sequences of actions described herein can be performed by specific circuits (e.g., application specific integrated circuits (ASICs)) and/or by program instructions executed by at least one processor to enable the at least one processor to perform the functionality described herein. Furthermore, the sequence of actions described herein can be embodied in a combination of hardware and software. Thus, the various aspects of the present invention may be embodied in a number of different forms, all of which have been contemplated to be within the scope of the claimed subject matter.

The terms "program," "computer program," "software application," "module" and the like as used herein, are defined as a sequence of instructions designed for execution on a computer system. In addition, for each of the embodiments described herein, the corresponding form of any such embodiment may be described herein as, for example, "a computer configured to" perform the described action. Any such computer, program, computer program, module or software application may include a subroutine, a function, a procedure, an object implementation, an executable application, an applet, a servlet, a source code, an object code, a shared library, a dynamic load library and/or other sequence of instructions designed for execution on a computer system. A memory or data storage means, as defined herein, includes many different types of computer readable media including volatile storage such a RAM, buffers, cache memory, and network circuits.

With reference now to FIG. 1, a first perspective view of an exemplary embodiment of an exciter system 10 according to a first preferred embodiment of the present invention is provided. As shown, the exemplary exciter system 10 is preferably transportable via an unmanned ariel vehicle (UAV) or the like. The exciter system 10 may preferably also include powered magnets which allow the system 10 to attach and detach from a variety of ferrous objects 12 and other surfaces for inspection as discussed further below.

Figure 2:
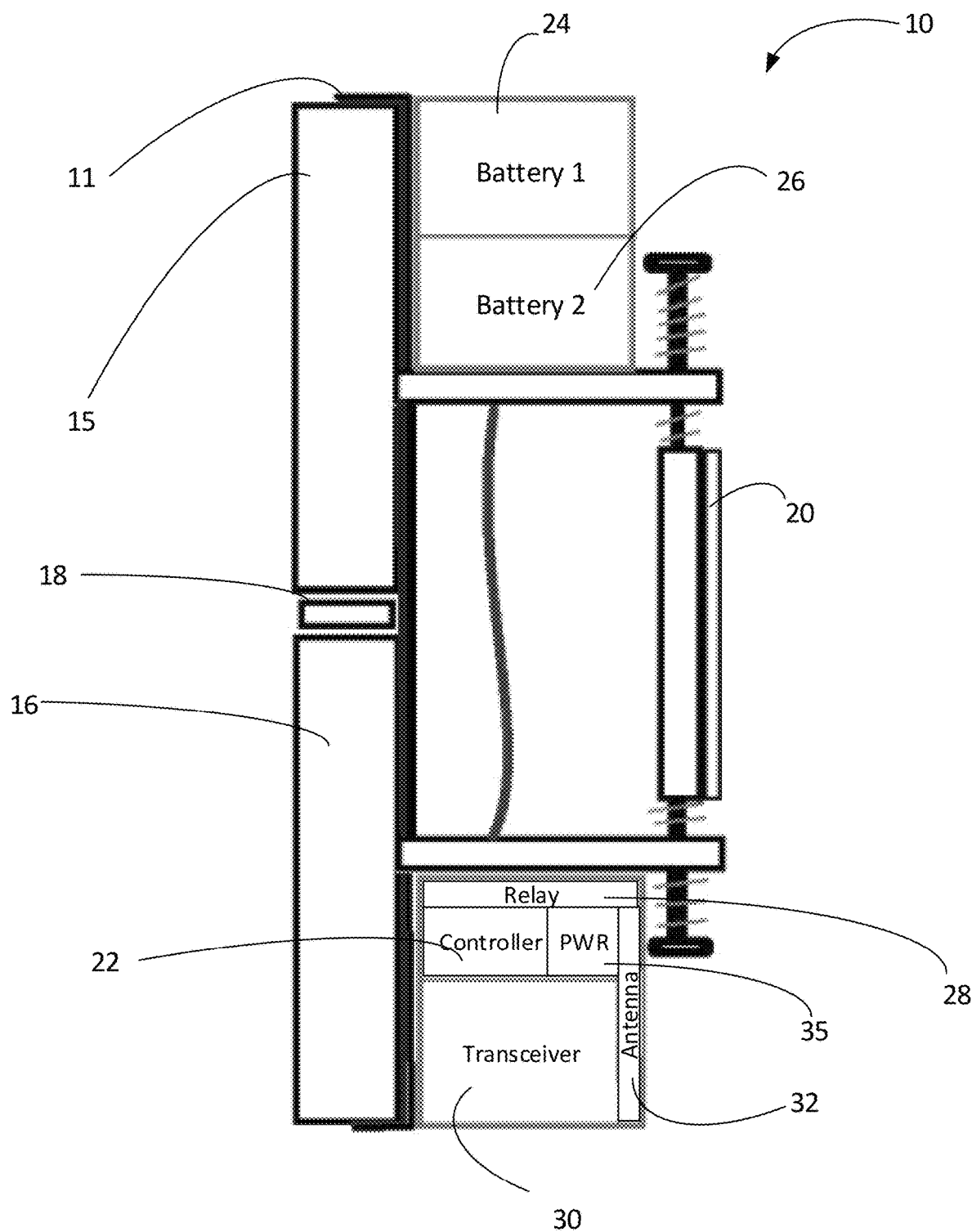
FIG. 2 is a block diagram illustrating a side view of the exemplary embodiment shown in FIG. 1.
Figure 3:
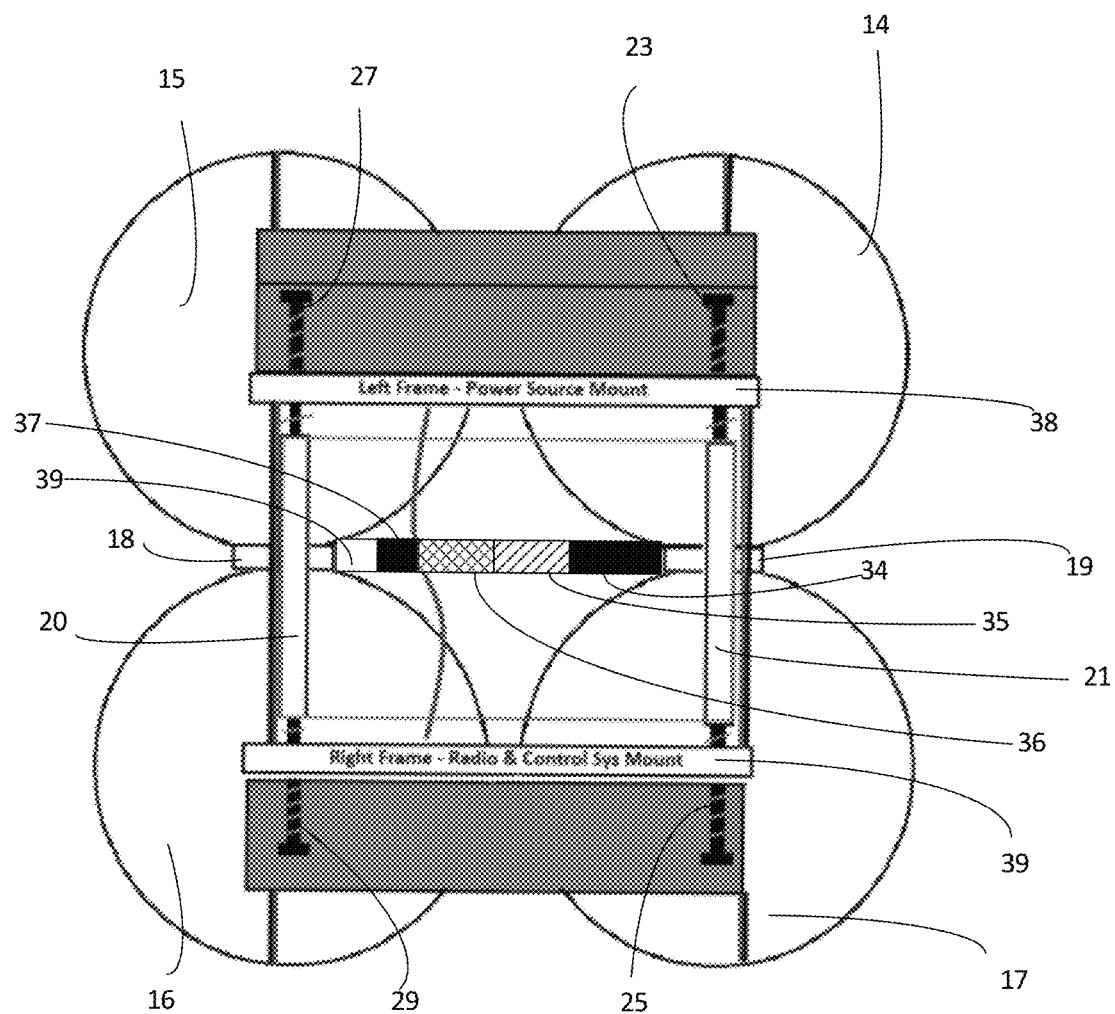
FIG. 3 is a block diagram illustrating atop view of the exemplary embodiment shown in FIG. 2.

Referring now to FIGS. 2 and 3, more detailed diagrams of the exciter system 10 of the present invention are provided. As shown, the exemplary exciter system 10 of the present invention may include a variety of systems and sub-systems for the attachment and detachment from ferrous objects. As shown, the exciter system 10 of the present invention may preferably include one or more magnetic elements 14, 15, 16, 17 which are preferably selectively powered as discussed further herein. Preferably, the electromagnets 14-17 may emit individual magnetic fields directed away from the system 10 and outward to a ferrous surface.

The magnetic elements 14-17 are preferably connected using one or more central hinges 18-19 which allow the magnetic elements 14-17 to more closely conform to the surface of a target object. The central hinges 18-19 preferably allow pairs of magnetic elements (e.g., pairs of top and bottom elements 14, 16 and 15, 17) to angle forward (as shown in FIG. 1). Preferably, a tension array 20 or the like may be provided to provide biasing tension between each pair of magnetic elements 14, 16 and 15, 17 which may be overcome by the magnetic attraction between the magnetic elements 14-17 and a given object. Alternatively, a piezoelectric motor or the like may be provided to move the magnetic elements 14-17 into their proper relative positions.

According to a preferred embodiment, the tension array/tensioners 20, 21 may mechanically connect the right and left frame 38, 39 at two or more points and may include a shaft 23, 25, 27, 29 on each end of each tensioner 20, 21. The shaft 23, 25, 27, 29 of each tensioner 20, 21 preferably includes springs located on both sides of a given frame 38, 39. According to a preferred embodiment, the springs may be held in place by a machined or fastened cap to the shaft. Preferably, the shafts 23, 25, 27, 29 may float up and down inside channels cut into the frame. Combined, the arrangement of the present invention preferably allows for a degree of movement of the electromagnet array.

According to a further preferred embodiment, the two tensioners 20, 21 may be connected to each other with a ferrous plate. In this configuration, the ferrous plate may attach to each tensioner 20, 21 using bolts that pass through the plate into female threads located on the tensioners 20, 21. Preferably, the ferrous plate is rigid enough to support the weight of the entire exciter system 10 and to allow magnetic latching by robotic or UAV systems to install the exciter system on a surface.

According to a further preferred embodiment, power to the magnetic elements 14-17 may preferably be selectively conveyed from one or more relays 28, conductors 11 and the like. Preferably, power to the magnetic elements 14-17 and the rest of the system 10 may be provided by a single or dual battery array 24, 26. A central controller 22 preferably is programmed to control the power supplied to the magnetic elements 14-17 and other sub-systems of the present invention as discussed further below.

The batteries 24, 26 may be rechargeable or replaceable. In the case of rechargeable batteries, the batteries 24, 26 may preferably be mounted inside a housing which supports an external connection for charging. In the case of a dual battery array, the battery housing may preferably be internally wired to provide a series or parallel power circuit.

According to a preferred embodiment, the battery system of the present invention may include a ground which is electrically connected to one or more electromagnets 14-17, the power control module 35 and/or a relay 28.

As shown, a transceiver 30 and an antenna 32 are preferably linked to the controller 22 to allow for relaying data and/or instructions between the central controller 22 and one or more remote terminals. Preferably, the antenna 32 may be internal to the same housing as the transceiver, power control and relay module. Alternatively, the antenna 32 may be externally mounted and may be connected via a female mounted RF connector or the like. Whether internal or externally mounted, the antenna 32 is preferably electrically connected to the transceiver 30 through a circuit board, shielded cabling and/or the like.

According to a preferred embodiment, the transceiver 30 is preferably a bidirectional radio capable of both transmitting and receiving wireless information. Preferably, the transceiver 30 may include one or more transceiver elements for communicating with any of a range of wireless protocols. For example, the transceiver 30 may include any of a mix of modulators, demodulators and/or receivers for a range of protocols including (but not limited to): Wi-Fi (802.11xxx), 2G-5G, LTE, NFC, RFID, and Bluetooth protocols. Preferably, the transceiver may be made to operate on any ISM (Industrial Scientific Medical) and may also be made available to be compatible with UAS (unmanned aerial system) or robotic system controls. The transceiver 30 may preferably receive commands from a remote station/operator and provide those commands to the power control module 35 as discussed in more detail below. Further, data obtained by the system 10 may be relayed to a remote wireless station.

The controller 22 may incorporate a power control module or may interface with a separate power controller 35 to control and route power within the system 10. Preferably, the power controller 35 may initiate and transmit commands to control the functions of each electrical element within the system 10 of the present invention. Exemplary control and command signals may include commands to control electrical parameters such as: power ON/OFF to all or individual electromagnets, power intensity, magnet polarity, and a polarity reversal of one or all magnets. In the case of the polarity reversal command, the power control module/power controller 35 may be programmed to change the polarity of selected magnets in a manner that allows at least one magnet at any given time during the reversal process to remain latched to a ferrous surface.

According to a preferred embodiment, one or more of the systems, subsystems, actions and/or features the present invention may be controlled either by firmware on the system and/or via wireless control. For example, the system may preferably provide and include wireless control of magnetic latching, phased reversal of polarity to maintain latching, magnetic field strength, and other operations.

Preferably, when commands received by the power control module 35 involve supplying power to one or all electromagnets, the connected relay module 28 may preferably handle higher amperage power distribution to the given electromagnet(s) and the level prescribed by the power control module. According to a preferred embodiment, the connection between the power control 35 and relay module 28 may be accomplished via a circuit board, cabling or a series of pins that allow for the flow of both power and data. Preferably, the power control module 35 may also monitor current power levels of onboard batteries, and the activity of selected electromagnets. According to further preferred embodiments, the power control module 35 may be expanded to support ancillary devices such as lighting modules and the like.

With further reference to FIG. 3, the system 10 of the present invention may preferably also power and support one or more scanning instruments. These scanning instruments may preferably include an IR thermal camera 34, a visual spectrum camera 35 and a magnetic field detector 36. Additionally, the system of the present invention may preferably further include one or more excitation instruments. These may include a heating source 37 and a lighting source 39. Where needed, the system of the present invention may preferably further use the electromagnets 14-17 to create and adjust one or more magnetic fields within a given target area. Alternatively, a separate, dedicated electromagnet may be use.

Figure 4:
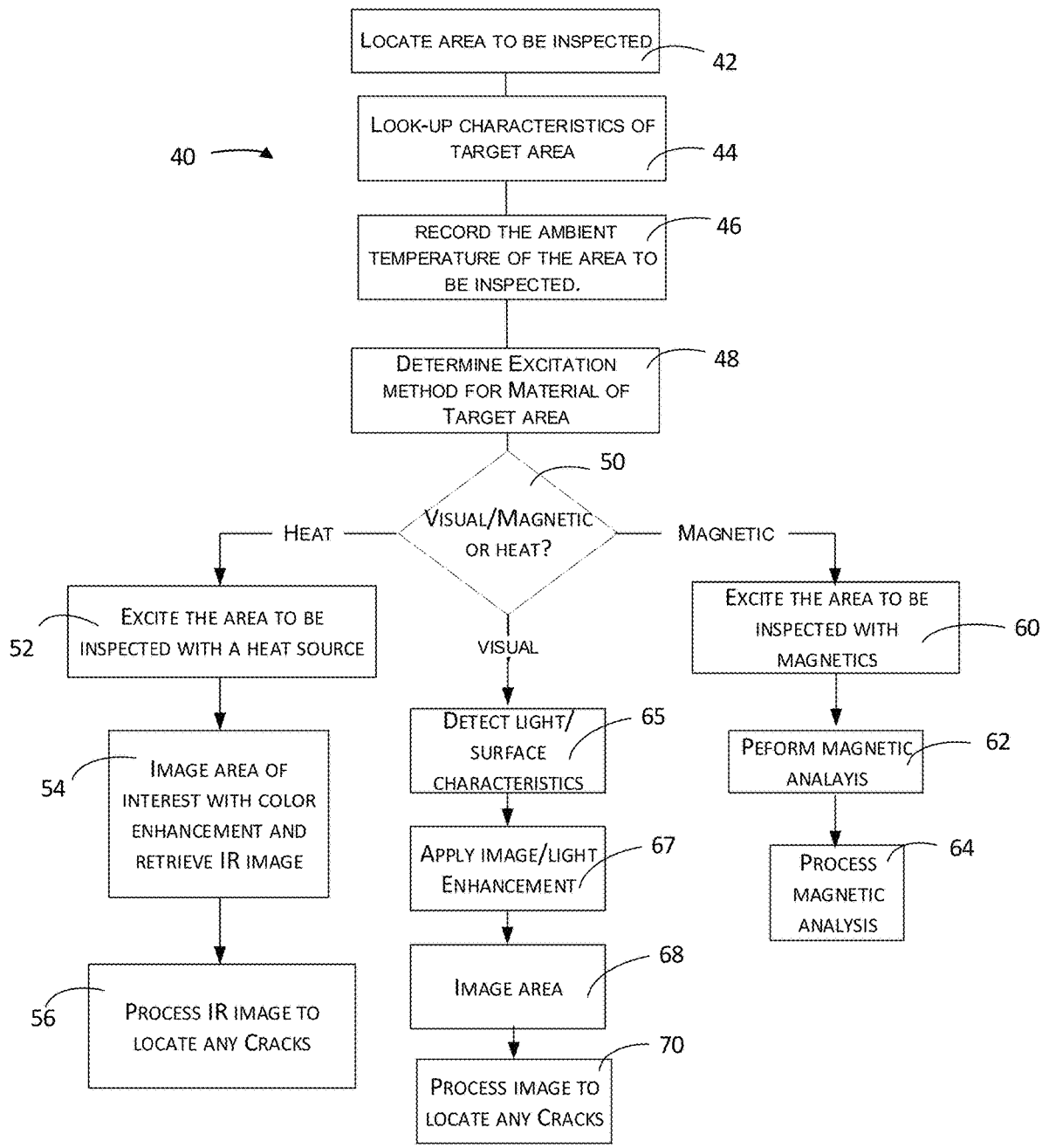
FIG. 4 is a flow chart illustrating a first exemplary set of steps in accordance with a first preferred method of the present invention.

With reference now to FIG. 4, an exemplary method 40 incorporating exemplary steps of the present invention shall now be discussed. At a first step 42, the system of the present invention preferably functions to locate an area to be inspected. According to a first preferred embodiment, the location of an area to be inspected may be stored and tracked on a remote server. The stored location may then be transmitted to an operator, a UAV controller and/or the system controller. At a next step 44, once the target area is identified, the system may then preferably look-up and/or receive a set of scanning characteristics for the target area. At a next step 46, the system may then record the ambient temperature of the target area. According to a preferred embodiment, the IR temperature may be recorded via a UAV mounted IR thermometer.

At a next step 48, the system may then process the area characteristics, the ambient temperature, and other factors to determine what type of scanning and/or excitation method is to be used on the target area. According to a preferred embodiment, the system may determine whether to perform a visual, magnetic and/or heat inspection of the target area. According to a further preferred embodiment, multiple techniques may be selected to be performed in turn.

At step 50, the system may then proceed to initiate the selected inspection/excitation method for the target area. At a next step 52, where a heat inspection is selected, the system may first excite/heat the target area with a heat source. According to a preferred embodiment, the target area may be heated with a heat source that is either affixed to a deploying UAV or deployed via the UAV. At a next step 54, the system may then image the target area with color enhancement and retrieve an IR image of the target area. At a next step 56, the system may then process the IR image to locate and measure any cracks or deformities.

Where the system at step 50 initiates magnetic excitation, the system at step 60 may take an initial step of exciting the target area magnetically by creating/projecting a magnetic field within the target area. According to a preferred embodiment, the target area may be subjected to a magnetic field which is created by a magnetic source either affixed to a deploying UAV or deployed via the UAV. At a next step 62, the system may then analyze the magnetic field at various points within the target area. At a next step 64, the system may then process the magnetic analysis to detect any anomalies representing cracks, deformities, or other characteristics.

Where the system at step 50 initiates a visual spectrum analysis, the system at step 65 may detect light and light affecting surface characteristics within the target area. At a next step 67, the system may apply or use light, light filters, and other image enhancements for imaging the target area. At a next step 68, the system may then preferably image the target area. At a next step 70, the system may then process the collected image data to locate and evaluate any anomalies representing cracks, deformities, or other characteristics.

The present invention has been disclosed above with reference to several examples. These examples are not intended to be limiting. Instead, the scope of the present invention should be determined purely by the terms of the appended claims and their legal equivalents.

What is claimed is:

1. An electromagnetic variable exciter system, wherein the system comprises:
    a plurality of electromagnets, wherein the plurality of electromagnets emits a magnetic field directed away from the system;
    a power control module, wherein the power control module is configured to receive remote commands; wherein the power control module is configured to control power to individual electromagnets;
    a transceiver, wherein the transceiver is a bidirectional radio capable of both transmitting and receiving wireless information; wherein the transceiver is configured to receive commands from a remote station and to provide received commands to the power control module;
    a relay module, wherein the relay module is electrically connected to the plurality of electromagnets; and
    a tension array, wherein the tension array is configured to provide a biasing force between at least one pair of electromagnets.

2. The system of claim 1, wherein at least a pair of electromagnets are attached at a hinged attachment point.

3. The system of claim 2, wherein power for the pair of electromagnets is conveyed from a relay module by the means of two conductors.

4. The system of claim 3, wherein the power control module is configured to control power parameters of one or more of the electromagnets.

5. The system of claim 4, wherein the power parameters comprise a parameter selected from the group of parameters comprising: the power intensity and magnet polarity.

6. The system of claim 5, wherein the transceiver is compatible with robotic system controls.

7. The system of claim 6, wherein the transceiver is configured to receive commands from a remote station and to provide those commands to the power control module.

8. The system of claim 7, wherein the system further comprises a battery system.

9. The system of claim 8, wherein the battery system is comprised of a dual battery array.

10. The system of claim 9, wherein the power control module is configured to monitor current power levels of the dual battery array.

11. The system of claim 10, wherein the battery system is electrically connected to one or more of the plurality of electromagnets, the power control module and the relay.

12. A method for exciting a target area with an excitation source which is affixed or deployed via an Unmanned Aerial Vehicle (UAV), wherein the method comprises:
    recording a first ambient temperature within a target area;
    exciting physical material within the target area;
    recording a second ambient temperature within the target area;
    comparing the first and second ambient temperatures; and
    determining the type of material within the target area based on the comparison of the first and second ambient temperatures;
    wherein the target area is excited by heat, magnetics or visually enhanced to an appropriate level based on the detected type of material within the target area.

13. The method of claim 12, wherein the second ambient temperature is recorded using an IR thermometer.

14. The method of claim 13, wherein the IR thermometer is mounted on a UAV.

15. The method of claim 14, wherein the excitation source is selected from the group of excitation sources comprising: a heat source, a magnetic source and a light source.

16. The method of claim 15, wherein the excitation source comprises a magnetic excitation source.

17. The method of claim 16, wherein the magnetic excitation source comprises an electromagnet.

18. The method of claim 17, wherein the magnetic excitation source is configured to excite ferrous material within the target area.

* * * * *